Jan. 4, 1955

R. HOFFERBER 2,698,518

CHECK DAM FOR IRRIGATION DITCHES

Filed March 27, 1953

INVENTOR.
RAYMOND HOFFERBER

BY

ATTORNEY

2,698,518

CHECK DAM FOR IRRIGATION DITCHES

Raymond Hofferber, Prospect, Colo.

Application March 27, 1953, Serial No. 345,190

6 Claims. (Cl. 61—29)

This invention relates to check dams for irrigating ditches, and more particularly the canvas type dams having a rigid single upper cross bar for its sole supporting means and on which the canvas is rolled when not in use.

A primary object of my invention is the provision of such a check dam having an unfastened tuck-gathering portion of the canvas, centrally of the cross bar portion, adapted to act as a flume-gap gate for permitting water to pass through that unfastened tuck-gap portion of the dam only.

Another primary object of my invention is the provision of adjustable means, associated with that rigid cross bar and that unfastened tuck-gathering gap portion of the canvas, for altering the size of said flume-acting gap portion, for varying the desired amount of water capable of passing through said gap portion.

Other and further objects will be apparent to those skilled in the art from the drawings and following detailed description of my invention, reference being had to the accompanying drawings, in which.

Throughout the drawings like reference characters have been used to designate like parts.

Figure 1:
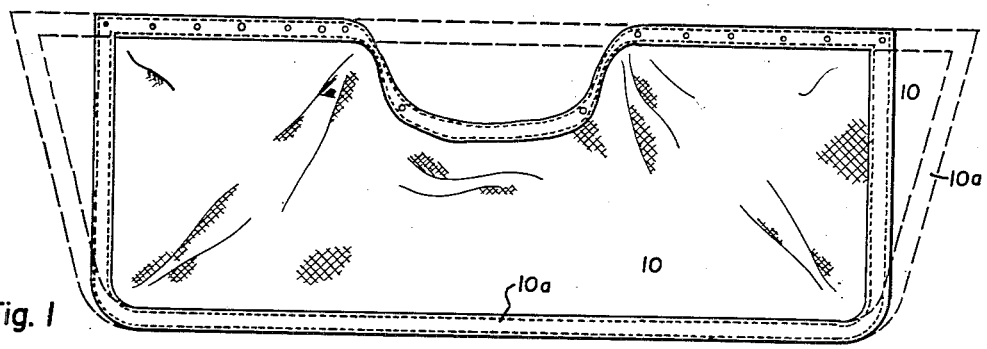
Figure 1 illustrates the relative configuration of the canvas portion of my dam, shown in dotted lines, before it is attached to my cross bar.
Figure 2:
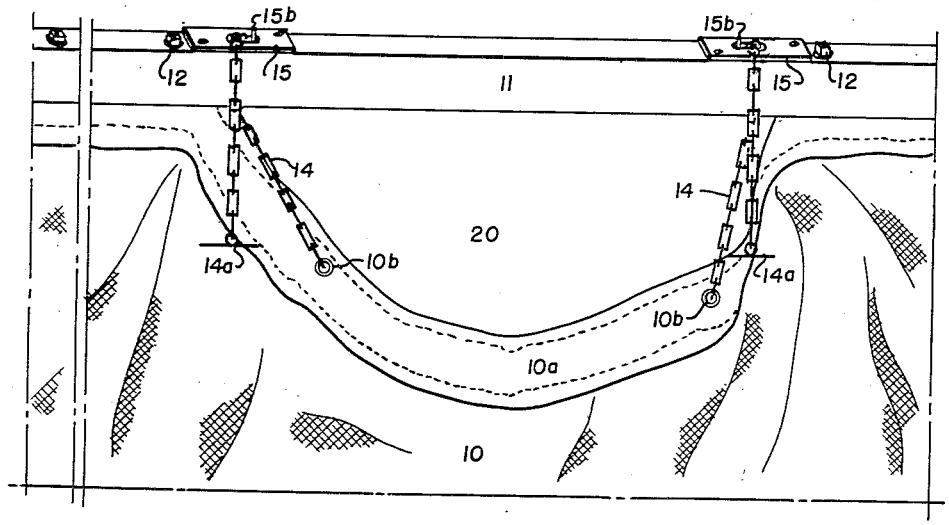
Figure 2 is an elevational side view of my check dam.
Figure 3:
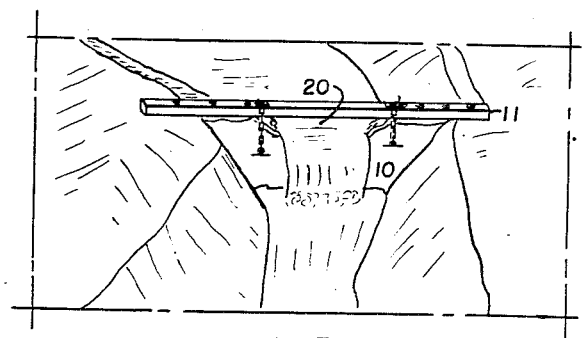
Figure 3 is a diagrammatical elevational view of my dam in operation in a lateral irrigation ditch.
Figure 4:
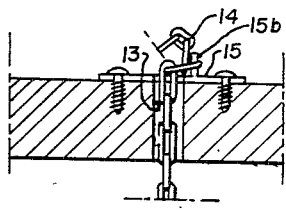
Figure 4 is a vertical cross-sectional view of a part of the cross bar of my check dam, showing the construction of the adjustable means I use for regulating the size of the flume-acting unfastened gap portion of my canvas, with relation to the horizontal cross bar.

My dam comprises a piece, of about 8 ounce canvas, 10, of trapezoidal configuration as shown in dotted line outline in Figure 1, secured, as illustrated, to a non-collapsible or rigid single cross bar 11. Canvas 10 has a reinforcing border, 10a, sewed around its peripheral edge. Along the longest edge of the canvas border, I spacedly provide a set of reinforced holes, 10b. I provide a corresponding set of holes 13 in the cross bar 11, each axially aligned and uniformly spaced, for purpose of having bolts 12 secure the canvas to the bar, as illustrated. In securing the canvas 10 to the cross bar 11, by the bolts 12, it will be seen that I first bunch together or gather the top central portion of that longest edge of the canvas and I do not secure that central top edge bunched or gathered portion to the bar, as will be explained. The rest of that longest edge of the canvas, on each side of the gathered portion, I secure, in stretched relationship, as illustrated, by means of individual ones of bolts 12, each having nuts therefor, onto the bar. As so secured to the cross bar 11, the general outer contour of the outer two side edges of the canvas, its bottom and the cross bar 11, together form a substantially rectangular check dam unit. Due to the unfastened top edge central portion, designated as 20, being a bunched-together or tuck-gathered portion of the canvas, and the rest of that top edge being fastened to the cross bar 11, it will be seen that said tuck-gathered portion 20 will act as a gap in the check dam for permitting the water from a lateral ditch to flow through that gap or over the top edge of that gathered portion and between that top edge and the cross-bar, as diagrammatically illustrated in Figure 3. I provide a novel way of adjusting the size of that gap 20, for controlling the amount of water permitted to pass through that gap, in the form of a like pair of adjustable chain means extending from that gathered portion upper edge of the canvas to the cross bar thereabove, as illustrated. I provide a suitable hole 13 vertically through the cross bar 11 substantially above each of the holes 10b, through the upper gathered portion of border 10a of the canvas, with each of holes 13 being adapted for slidably receiving a chain 14. A support plate 15 is secured, as by a pair of conventional wood screws, to the upper surface of the cross bar over each of holes 13, each of said plates having a central opening 15a in alignment with a chain hole 13. A vertical post 15b is welded onto the upper surface of each plate 15, for reason as will be further explained. I provide a chain 14, having a conventional pivotal cross key portion, 14a, at its lower end, and thread that chain downwardly through a chain hole 13 of the bar and through its adjacent tuck-gathered portion hole 10b of the canvas. The upper portion of the chain has one of its links removably placed over post 15b, and the lower end of the chain is prevented from pulling through canvas tuck portion hole 10b, through which it extends, by virtue of the action of the conventional cross-key portion 14a automatically turning cross-wise of the main part of the chain. A second cross key portion, 14a, identical to the first, is secured at the other end of the chain. It will be understood that each of said cross key portions 14a comprises a straight portion pivoted at its center to the last link of the chain, whereby it can be manually swung on its pivot with its longitudinal axis parallel with and along the longitudinal axis of the chain when desired to insert the end of the chain and its cross key through a hole. Each of the holes 13 is large enough to permit a chain, with its end cross key so pivoted in parallel alignment with it, to slidably be inserted therethrough. I provide an identical pair of adjustable chain holding means for regulating the size of the gap 20 in the gathered tuck portion of the upper edge of the canvas. More than two may be provided, if desired. I adjust the length of the chain holding means, in each of said identical pair, by lifting the chain link on the post 15b off of that post, and then either raising or lowering the chain through or with relation to the hole 13 in cross bar, the desired amount so as to reduce or increase the size of the flume-acting gap area 20, respectively, between the upper edge of the gathered tuck portion, of the top central part of the canvas, and the under side of the cross bar 11, and then replacing a link of the chain on that post 15b at a link to cause the chain to hold that gathered edge at that desired distance from that bar. In making adjustment of said gap portion 20, while I preferably set both of the chains, as just explained, in like or the same horizontal length adjustment from the bar 11, it is to be understood that one of my chains may, if desired, be adjusted independently of the other thereof, for controlling the water escape area of the gap 20. If the chains 14 are both pulled fully up through their respective holes 13, and locked with relation to the bar 11, by having a link of each placed over its respective post 15b, it will be seen that then there will be a substantial complete closing of that gap 20. I construct my dam of a trapezoidal shaped piece of canvas 10, per dotted lines of Figure 1.

Heretofore check dams comprised a single bar and a canvas secured with its top edge fully fastened to that bar.

A check dam of this type is used by laying the cross bar across the lateral ditch, from which the water is taken out to individual crop rows. To be able to hold the water at a given row point, my dam is placed across the ditch, the canvas permitted to hang downwardly into the ditch, so as to fully block the passage of water therethrough except for the opening or gap portion 20 thereof, and the outer side and bottom edges of the canvas are temporarily secured to the sides of the lateral ditch in conventional manner as by spading some earth or mud and placing it on and against the part of the canvas lying on and against the side and bottom of the ditch.

By means of my improved check dam, with its adjustable flume-acting tuck-gathered gap portion 20, I am able to irrigate a considerably large plurality of growing crop rows at a time than before, by using several of my improved check dams, at spaced intervals in the lateral ditch, and by each of my dams adjusting the flume-acting gap portions 20 of each, as taught herein, so as to confine most of the water upstream of the lateral ditch and above a dam, and at the same time permitting a small portion of that water, in controlled amount, to pass through a gap portion 20 of each dam, in step-down arrangement with relation to such a plurality of such use of my dams.

It is to be understood that various and sundry changes may be made in the preferred embodiment of my invention herein disclosed, illustrated and explained, without deviating from the spirit and teaching of my invention; and, therefore, I wish to be bound only by the scope of the hereunto appended claims.

What I claim and desire to secure by Letters Patent is:

1. In a check dam of the class described, in combination, a rigid straight cross bar, a trapezoidal piece of canvas having non-gathered portions of its longest edge secured to the cross bar with the center of the canvas of that edge gathered together and being unsecured to said bar, and means for securing said non-gathered portions to said bar, said gathered unfastened center portion of the canvas comprising a flume-acting gap in the use of the dam.

2. In a check dam of the class described, in combination, a rigid straight cross bar, a trapezoidal piece of canvas, said canvas having one of its edges longer than the rest thereof, said longest edge having its outermost portions thereof sealingly secured to the bar and with its central portion in unfastened and gathered contour, means for securing said outermost portions to the bar, said unfastened gathered central portion of said longer edge being adapted to comprise a flume-acting gap for permitting water to pass over that gathered central portion upon use of the dam, and adjustable means associated with the bar and said unfastened central gathered portion for adjustably varying the distance between said cross bar and said gathered portion for controlling the volume of water passing through said gap over said gathered portion upon use of the dam.

3. A check dam combination as claimed in claim 2, and characterized further by the definition of said adjustable means including a suspension chain means.

4. In a check dam for an irrigation lateral, in combination, a rigid straight cross bar, a flexible impervious sheet member having a longer edge than the length of the bar and adapted to have said edge secured to the bar, the outer portions only of said edge being sealingly secured to said bar after the central portion of the edge has been loosely gathered together, said gathered central portion being sealingly unfastened with relation to the bar, said gathered central portion being adapted to normally act as a gate for permitting water to pass thereover upon use of the dam, and means for so securing said outer portions of said edge of the flexible member to the bar.

5. A check dam combination as claimed in claim 4, and characterized further by the addition of means for decreasing the normal gate distance between the bar and the central gathered edge portion of the sheet member for decreasing the amount of water otherwise normally permitted to pass over said gathered edge portion.

6. In a check dam for irrigation laterals, a rigid straight cross bar, an impervious flexible sheet having an edge thereof secured thereto with the central portion of said edge being loosely gathered together in unsecured relationship with the bar and with the outer portions of said edge being sealingly secured to the bar, means for so securing said outer portions to the bar, said gathered portion of the sheet normally comprising a flume-acting gap upon use of the dam for permitting water to pass therethrough, and adjustable means for effecting substantially a draw-string-action effect of said gathered central portion and thereby for decreasing the overall area size of said gap between the central gathered portion and the bar for limiting the volume of water capable of passing through the gap upon use of the dam, said means being associated with said gathered portion.

References Cited in the file of this patent

UNITED STATES PATENTS

| | | |
|---|---|---|
| 771,821 | Gleazen | Oct. 11, 1904 |
| 1,318,656 | Fitzgerald | Oct. 14, 1919 |
| 1,784,955 | Ballard | Dec. 16, 1930 |